April 2, 1935.  H. C. HARRISON  1,996,511
PHONOGRAPH REPRODUCING SYSTEM
Filed Aug. 2, 1933
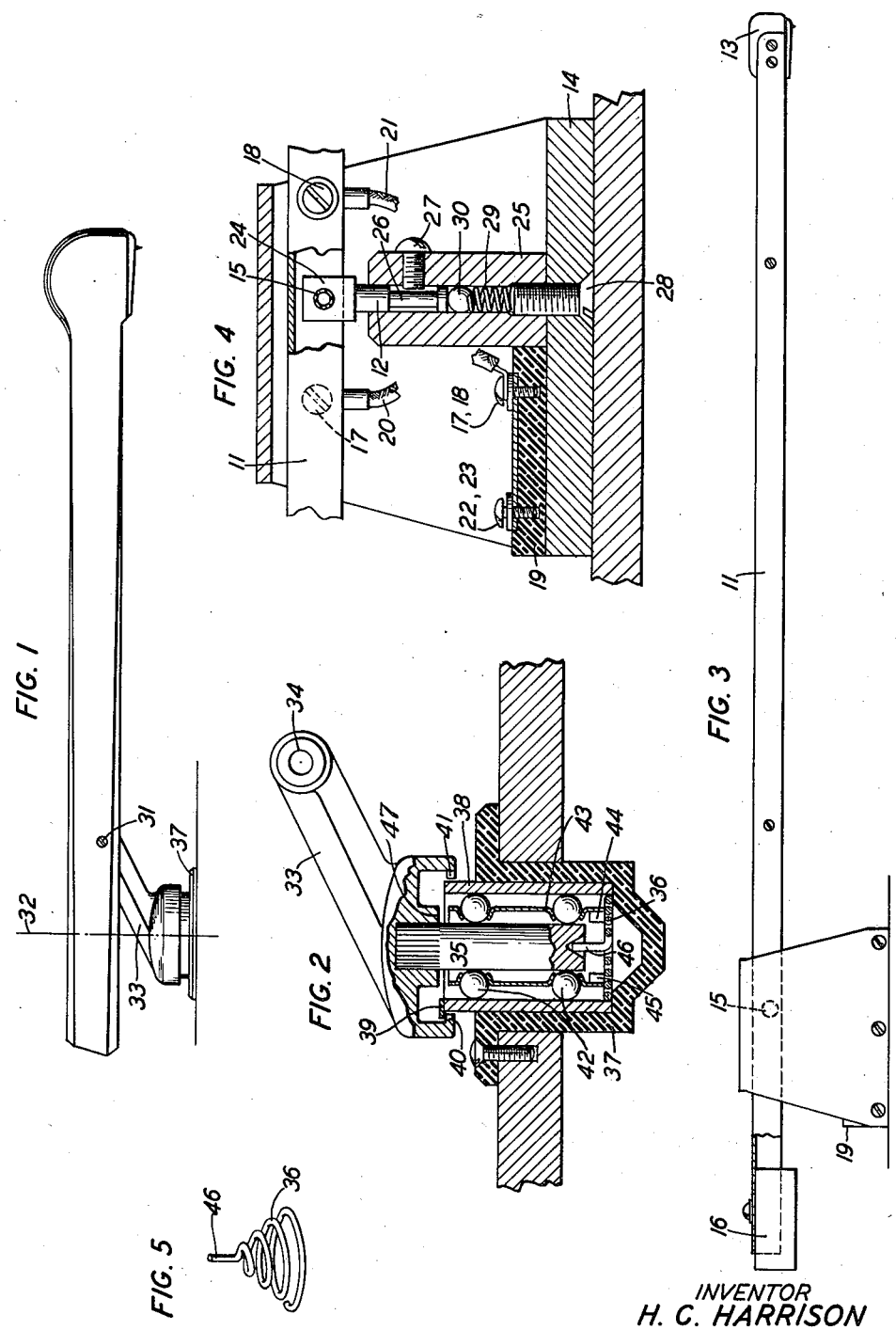
INVENTOR
H. C. HARRISON
BY
G. M. Campbell
ATTORNEY Patented Apr. 2, 1935

1,996,511

UNITED STATES PATENT OFFICE 1,996,511

PHONOGRAPH REPRODUCING SYSTEM

Henry C. Harrison, Port Washington, N. Y., assignor to Bell Telephone Laboratories, Incorporated, New York, N. Y., a corporation of New York Application August 2, 1933, Serial No. 683,252

3 Claims. (Cl. 179—100.41)

This invention relates to phonograph reproducing systems and particularly to suitable means for mounting the reproducer supporting arm on the frame of the machine.

Reproducer supporting arms are commonly mounted on a vertical pivot to swing freely across the surface of the record and by means of this mechanical connection extraneous vibrations from the driving motor and other sources are transmitted along the arm to the reproducer and appear as noise in the reproduced sound. Heretofore in the attempt to eliminate these vibrations various resilient mountings have been proposed. Some of these schemes involve the use of rubber as a bearing material between the pivot of the arm and its supporting member and others employ spring mountings which provide a very flexible connection between the reproducer arm and the frame of the machine. While such mountings may be more or less effective in preventing extraneous vibrations from being transmitted to the reproducer, they permit the reproducer arm too much freedom in a longitudinal direction and the frictional force of the stylus in the groove vibrates the arm longitudinally and thereby produces a phase distortion in the reproduced sounds.

In phonographs using a counterweight on the arm to balance a portion of the weight of the reproducer there is the additional difficulty that the inertia of the counterweight increases the tendency of the stylus to bounce in the groove. This tendency is noticeable not only when the reproducer is dropped on the record, but also while a record is being played, particularly in hill and dale systems where the groove undulations set various parts of the arm including the counterweight in vertical motion.

The object of this invention is a substantially aperiodic reproducer arm mounting which effectively dampens out both of these types of extraneous vibration and to a large extent prevents vibrations of the first type from even reaching the arm.

According to the general features of the invention the arm is resiliently supported on a vertical pivot and sufficient resistance is applied to vertical motion to dampen out effectively any vibration of the arm. The vertical pivot prevents the arm from vibrating laterally or longitudinally and the resilient support, preferably in the form of a helical or spiral spring, leaves the pivot free to move in a vertical direction except as restrained by suitable damping means. In cases where the horizontal pivot of the arm is directly above the vertical pivot, the damping may consist simply of the frictional resistance between the vertical pivot and its lateral bearing. In other cases, where to conserve space the horizontal pivot of the arm is between the vertical pivot and the reproducer, the bearing friction may be excessive in which case ball bearings may be used and the necessary damping obtained by the rolling friction of the balls on the vertical pivot.

The invention will be more clearly understood from the following detailed description and the accompanying drawing in which:

Fig. 1 shows a compact form of reproducer supporting arm suitable for ordinary reproducer applications;

Fig. 2 is a sectional view of the lateral and vertical bearing members for the vertical pivot of the arm of Fig. 1;

Figs. 3 and 4 show an assembly and detail view respectively of a reproducer arm for playback purposes; and Fig. 5 shows the helical supporting spring in Fig. 2 in its unstressed position.

The arm shown in Figs. 3 and 4 being primarily adapted for playback purposes is of the portable type so that it may be readily placed in position to play back an original recording which has just been completed and then removed from the recording machine so as not to interfere with subsequent operations. As is well known in the art, such reproducers must operate at very low record pressures to avoid injury to the grooves which would impair the usefulness of the recording as a master record. The arm 11 is therefore made comparatively long so that a slight lateral thrust by the wall of a record groove is sufficient to turn the arm about its vertical pivot 12 to feed the reproducer 13 across the record. When using this portable device the base member 14 is placed in any convenient position adjacent the record to be reproduced and no particular care is taken to see that the base is accurately leveled. For this reason the arm is built with the horizontal pivot 15 placed directly over the vertical pivot 12, or nearly so, so that even when the base 14 is not exactly level there will be no component tending to rotate the arm and thereby wear one side of the record groove as would be the case if the horizontal pivot were displaced from the vertical pivot as shown in the construction of Fig. 2. Due to the unusual length of the arm 11 and to the relative location of the pivot as already described, considerable overhang is necessary so that the counterweight 16 can effectively balance the proper proportion of the weight of the reproducer and the front portion of the arm.

The output of the reproducer 13 is conducted along the arm 11 by insulated strips, not shown, to binding posts 17 and 18 which are connected to the terminal block 19 by the conductors 20, 21. Binding posts 22, 23 are also provided on the block 19 so that the reproducer may be readily connected to the external circuit. The vertical pivot 12 is preferably of cold rolled steel and has a rectangular upper portion 24 engaging the horizontal pivot 15 of the arm 11. The lower or shank portion 26 of the pivot is of circular cross-section and makes a sliding fit with the hard rubber bearing 25. The intermediate portion of the shank 26 is of reduced cross-section as shown so that the set screw 27 is not in contact therewith but effectively limits the vertical motion of the pivot by engaging the shoulders of the shank. The hard rubber bearing 25 is secured to the brass base block 14 by a set screw 28 which also supports the helical spring 29. A ball bearing 30 is disposed between the spring 29 and the vertical pivot to permit the arm to turn freely as the reproducer moves across the record. The spring 29 is proportioned with respect to the weight of the arm so that in the absence of vibration the arm assumes the position shown and when the vibrations of the types already discussed cause the pivot to move in a vertical direction damping is applied to this motion by virtue of the friction between the shank and the bearing 25.

For a reproducer arm of the type shown in Fig. 1 where the horizontal axis 31 is disposed forwardly of the line 32 of the vertical pivot, a mounting, such as that already described, would not be suitable since the friction between the vertical pivot and its lateral bearing would be so great that the arm would not be sufficiently free in a vertical direction. The preferred mounting for arms of this type is shown in Fig. 2. The cantilever arm supporting member 33 is preferably of cast brass and at its outer end provides a bearing 34 for the horizontal pivot 31 on the reproducer arm. The vertical pivot member 35 of cold rolled steel is press fitted into the member 33 as shown and is supported by the spring 36. This spring in its unstressed condition assumes the form shown in Fig. 5 and is of the proper stiffness so that when supporting the weight of the reproducer arm it is deformed to the plane position as shown in Fig. 2. The spring is supported by a cup member 37 which is preferably of molded bakelite, the steel tubing 38 being molded in place when the cup is made. A stop member 39 on the upper surface of the tube 38 retains the vertical pivot in its socket but when the arm 33 is in place the upper surface of the flange 40 is slightly below the stop member to provide vibrating clearance in a vertical direction. The flange 40 has a slot 41 on the side opposite the stop member so that the vertical pivot assembly may be removed from its socket by merely turning the member 33 around so that the slot is directly beneath the stop. The pivot is held in the vertical position by two sets of ball bearings 42 in the tubular ball bearing holder 43 which is suitably embossed to retain the balls in their proper positions.

To keep the frictional resistance to vertical motion of the pivot 35 low enough and substantially uniform in value there must be no sliding between the balls and either the pivot or the tube 38. For a moving pivot and a stationary tube the condition for pure rolling is that the holder 43 shall vibrate in phase with the pivot but at one-half the amplitude. Since rolling friction is less than sliding friction this condition would be substantially fulfilled with no support for the holder if it were not for the constant tendency of its own weight to move it downwardly. The holder 43 is therefore resiliently mounted on the spring 36 preferably by three lugs, two of which, 44 and 45, are shown in the drawing, engaging an intermediate turn of the spring such that the vertical motion imparted to the holder is substantially half that of the end 46 of the spring. In order to avoid the possibility of the holder moving up too far a boss 47 on the member 33 acts as an upper stop member.

With this construction the vertical pivot is free to vibrate on its resilient spring support and the friction of the balls 42 on the inner surface of the tube 38 exerts sufficient damping action to make the device substantially aperiodic. The value of the frictional resistance thereby produced can be adjusted to suit the requirements of the particular structure by properly proportioning the spacing between the two sets of balls with respect to the horizontal distance between the vertical and the horizontal axes. In the figure shown the tendency of the vertical pivot to rotate in the plane of the drawing about an axis perpendicular to its vertical axis due to the overhang of the cantilever member 33 is effectively prevented by the compressional stresses on the upper and lower sets of balls. If the upper and lower sets of balls are spaced farther apart than shown in the drawing, the compressional force and hence the frictional resistance will be less whereas if they are spaced more closely together the compressional force will be greater and the damping action correspondingly increased.

While the invention has been described with reference to specific embodiments it will be understood that various modifications may be made within the scope of the following claims.

What is claimed is:

1. The combination with a supporting arm for phonograph reproducers, horizontal and vertical pivot members therefor, a resilient support for the vertical pivot and a cantilever arm connecting the pivot members, of a plurality of spaced lateral bearings for the vertical pivot, the spacing of the bearings being correlated to the length of the cantilever arm to provide sufficient frictional resistance in said bearings to vertical motion of the pivot to make the reproducer arm substantially aperiodic to vertical vibration.

2. The combination with a supporting arm for phonograph reproducers, a vertical pivot for the arm and a resilient mounting for the pivot, of a lateral pivot bearing comprising a fixed bearing surface, rolling members between the pivot and the surface and a holder for the members supported by the resilient mounting.

3. The combination with a supporting arm for phonograph reproducers, a vertical pivot for the arm and means for vibratably supporting the pivot, of a lateral pivot bearing comprising a fixed bearing surface, a plurality of sets of ball bearings between the pivot and the surface, and means responsive to the vibrations of the pivot for vibrating the ball bearings in phase with and at substantially one-half of the amplitude of the vibrations of the pivot.

HENRY C. HARRISON.